United States Patent
Zhang et al.

(10) Patent No.: US 11,689,033 B2
(45) Date of Patent: Jun. 27, 2023

(54) DUAL BATTERY PROTECTION OF RECHARGEABLE BATTERIES

(71) Applicant: Google LLC, Mountain View, CA (US)

(72) Inventors: Haoxing Zhang, Campbell, CA (US); David Wang, San Jose, CA (US); James Robert Lim, Mountain View, CA (US); Dietrich Shing-Quan Ho, Mountain View, CA (US)

(73) Assignee: Google LLC, Mountain View, CA (US)

( * ) Notice: Subject to any disclaimer, the term of this patent is extended or adjusted under 35 U.S.C. 154(b) by 177 days.

(21) Appl. No.: 17/228,872

(22) Filed: Apr. 13, 2021

(65) Prior Publication Data
US 2021/0376623 A1    Dec. 2, 2021

Related U.S. Application Data

(60) Provisional application No. 63/032,331, filed on May 29, 2020.

(51) Int. Cl.
H02J 7/00 (2006.01)

(52) U.S. Cl.
CPC .......... *H02J 7/0029* (2013.01); *H02J 7/0047* (2013.01); *H02J 7/0068* (2013.01)

(58) Field of Classification Search
CPC ....................................................... H02J 7/00
See application file for complete search history.

(56) References Cited

U.S. PATENT DOCUMENTS

| 7,508,171 B2 | 3/2009 | Carrier et al. |
| 10,084,326 B2 | 9/2018 | Kadirvel et al. |
| 2019/0379219 A1* | 12/2019 | Snyder ................. H02J 7/0031 |

FOREIGN PATENT DOCUMENTS

JP    2006304487    11/2006

* cited by examiner

*Primary Examiner* — Robert Grant
(74) *Attorney, Agent, or Firm* — Colby Nipper PLLC (57) ABSTRACT

This application is directed to protecting a battery or battery by a battery protection system including two distinct protection integrated circuits (PICs). The two PICs are configured to determine whether a drive current of the battery is at fault and generate distinct switching signals indicating whether the drive current of the battery is at fault. The two PICs are interchangeable with each other. The battery protection system further includes control logic and two switching components. The control logic is configured to combine the switching signals provided by the two PICs to provide a combined switching signal. Each switching component is coupled to the control logic and configured to control a current path of charging and discharging the battery based on the combined switching signal.

22 Claims, 6 Drawing Sheets

DUAL BATTERY PROTECTION OF RECHARGEABLE BATTERIES

RELATED APPLICATION

This application claims priority under 35 U.S.C. § 119(e) to U.S. Provisional Patent Application 63/032,331, filed on May 29, 2020, the disclosure of which is incorporated by reference herein in its entirety.

BACKGROUND

Lithium-ion batteries used in consumer electronic devices normally require two levels of in-device protection against a variety of unsafe operating conditions. The protection is commonly provided by a protection circuit module (PCM). Multiple methods are used to achieve these two levels of protection via the PCM. One method employs two protection integrated circuits (PICs) to protect the batteries from conditions such as overvoltage, undervoltage, overcharge current, overdischarge current, and short-circuit. Traditionally, the two PICs are identified as a "primary" PIC and a "secondary" PIC. The primary and secondary PICs are different chips with different settings and timings, which are offset in order to guarantee that the primary PIC triggers and functions (e.g., to cut off charging current) before the secondary PIC triggers. The traditional approaches can lead to oscillations, current leakage paths, and/or even damage to MOSFETs if the secondary PIC triggers before the primary PIC.

Accordingly, there is a need for new dual protection integrated circuits that are reliable and reduce the risk of damage to a rechargeable battery.

SUMMARY

This disclosure describes implementations of systems and methods for in-device battery protection. More particularly, control logic is added to the protection circuit module (PCM) within a battery to allow the use of primary and secondary protection integrated circuit (PIC) chips in an interchangeable manner. In particular, instead of using different protection ICs with carefully-specified operational characteristics to ensure that the primary PIC always triggers before the secondary PIC, the primary and secondary PICs described herein are substantially identical, with little or no variance or distinction in their respective operational specifications and characteristics (except for the small variations that can be found in any group of identical parts). The control logic added to the PCM ensures that the PCM is able to protect against the same unsafe operating conditions as prior art protection circuits (e.g., overvoltage, undervoltage, overcharge current, overdischarge current, and short-circuit) without the drawbacks associated with the traditional approach (e.g., oscillations, current leakage paths, and/or damage to MOSFETs if the secondary PIC triggers before the primary PIC).

In addition, employing identical primary and secondary PICs in the PCM simplifies the PCM design and manufacturing process. The control logic added to the PCM further saves manufacturing costs due to the use of higher (2X) volumes of the same chip for both the primary and secondary PICs instead of lower volumes of different chips.

In some implementations, the control logic added to the PCM is an AND gate, which can be implemented as part of a discrete PCM solution, or as integrated logic within the chip that is used for both the primary and secondary PICs.

As an additional advantage, the dual PICs with AND gate protection described herein, whether implemented using discrete components or integrated within the PIC, are deployed within the battery and do not require any interaction or intervention from the system electronics that are powered by the battery. As a result, no additional pin needs to be provided by the battery to permit monitoring or control of the PCM by the system electronics.

In one aspect, a battery protection system of a battery includes a first PIC coupled to the battery. The first PIC is configured to determine whether a drive current of the battery is at fault and generate one or more first switching signals indicating whether the drive current of the battery is at fault. The battery protection system includes a second PIC coupled to the battery. The second PIC is configured to determine whether the drive current of the battery is at fault and generate one or more second switching signals indicating whether the drive current of the battery is at fault. The first and second PICs are interchangeable with each other in the battery protection system. The battery protection system includes control logic coupled to the first and second PICs. The control logic is configured to combine the first and second switching signals to provide a first combined switching signal. The battery protection system further includes a first switching component and a second switching component. The first and second switching components are electrically coupled in series on a DC charging and discharging path of the battery. Each switching component is coupled to the control logic and configured to control the DC charging and discharging path using the first combined switching signal.

In some implementations, the first and second PICs are substantially identical to each other and separately arranged on two distinct substrates. In some implementations, for each of the first and second PICs, the drive current of the battery is determined to be at fault when the drive current falls out of a respective charge current range during charging of the battery. Alternatively, for each of the first and second PICs, the drive current of the battery is determined to be at fault when the drive current falls out of a respective discharge current range during discharging of the battery.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DETAILED DESCRIPTION

Figure 1A:
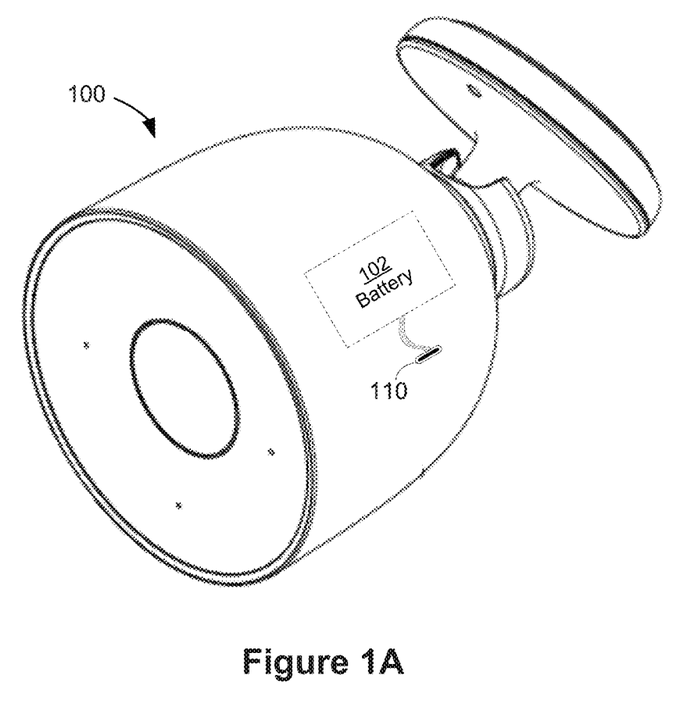
FIG. 1A illustrates an electronic device including a battery, in accordance with some implementations.

FIG. 1A shows an electronic device 100 including a rechargeable battery 102 in accordance with some implementations. The electronic device 100 can be a camera as shown, or a doorbell door lock, a display, a connected assistant device, a display assistance device, a speaker assistance device, an alarm, a hazard detector, a security detector, a thermostat, or any other type of electronic device that is powered by a rechargeable battery 102. In some implementations, the electronic device 100 includes one or more components, such as one or more: audio devices, light sources, sensors, CPU(s), memory, data input devices, data output devices, image sensor array, infrared illuminators, filters, etc., any of which is powered by the rechargeable battery 102. In some implementations, the electronic device 100 is configured to connect electronically with an external device through a wired connection (e.g., a Universal Serial Bus (USB) cable, a power cable, an High-Definition Multimedia Interface (HDMI) cable, etc.). The wired connection may allow power and/or data transmission between the external device and electronic device 100. For example, the wired connection can be used to provide power and/or charge to the battery 102.

Alternatively or additionally, in some implementations, the electronic device 100 includes one or more (external and/or visible) ports or connectors 110 for wired connections to the various components of the electronic device 100. As mentioned above, the wired connections can be USB or HDMI connectors, power connectors, etc. In some implementations, the one or more ports 110 are arranged on an exterior surface of the electronic device 100 and allow for external access to various components of the electronic device 100. In some implementations, the one or more ports 110 of the electronic device 100 can be used to charge the battery 102. For example, as described in more detail below, a wired connection between a port 110 of the electronic device 100 and an external power source (e.g., a portable power cell, power generator, power bank, etc.) can be used to provide power and/or charge the battery.

Figure 1B:
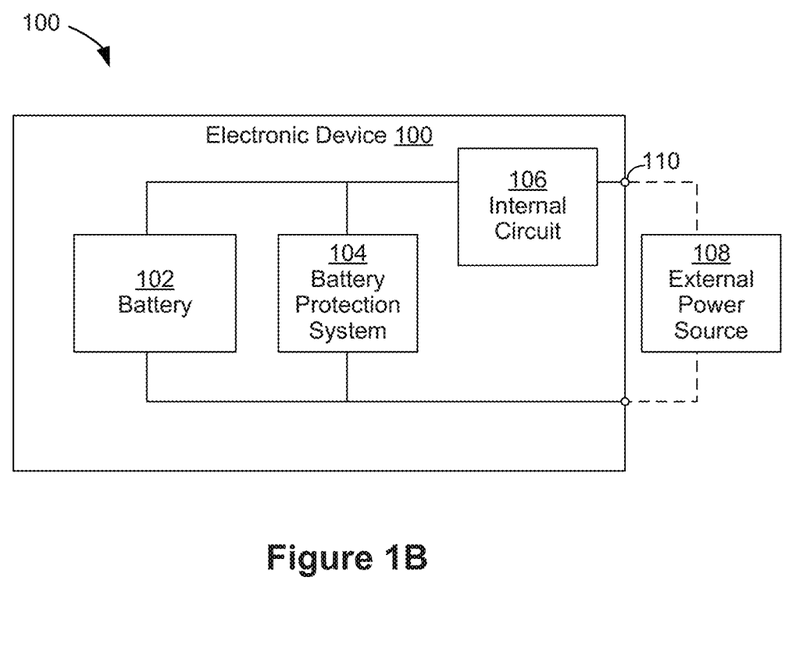
FIG. 1B illustrates a block diagram of an electronic device having a battery protection system, in accordance with some implementations.

FIG. 1B illustrates a block diagram of an electronic device 100 including a battery protection system 104, in accordance with some implementations. The electronic device 100 includes a battery 102. Optionally, the battery 102 is built into the electronic device 100 or is a replaceable module in the electronic device 100. In some implementations, the battery 102 includes a plurality of rechargeable battery cells electrically coupled at least partially in parallel (i.e., in such implementations the battery 102 can also be referred to as a battery pack). For example, in some implementations, the plurality of rechargeable battery cells of the battery 102 can be coupled according to a 1SnP parallel battery configuration, in which n is an integer indicating a number of battery cells connected in parallel (e.g., 1S2P, 1S3P, 1S4P) or a mSnP mixed battery configuration, in which m is an integer indicating a number of battery cells connected in series (e.g., 2S2P).

In some implementations, the battery 102 is electrically coupled to the battery protection system 104 and an internal circuit 106. The internal circuit 106 includes various components of the electronic device 100 such as CPU(s), memory, data input device(s), data output device(s), lens assemblies, heat sink(s), image sensor array(s), infrared illuminator(s), filter(s), etc. In some implementations, an external power source 108 is coupled to the battery 102 and the internal circuit 106. The external power source 108 is used to charge the battery 102 of the electronic device 100. In some implementations, the battery 102 and the battery protection system 104 are integrated into a single package/enclosure contained within the electronic device 100. In other implementations, the battery 102 and the battery protection system 104 are packaged as distinct packages/components within the electronic device 100.

In some implementations, the battery protection system 104 is configured to protect the battery 102 while the electronic device 100 is being charged by the external power source 108 and/or any other electrical source. In some implementations, the battery protection system 104 is designed within a protection circuit module of the battery 102. In some implementations, the battery protection system 104 uses control logic to combine switching signals generated by different protection integrated circuits and provide one or more combined switching signals to control charging and discharging of the battery 102. By these means, the different protection integrated circuits are interchangeable with each other in the battery protection system 104.

Figure 2A:
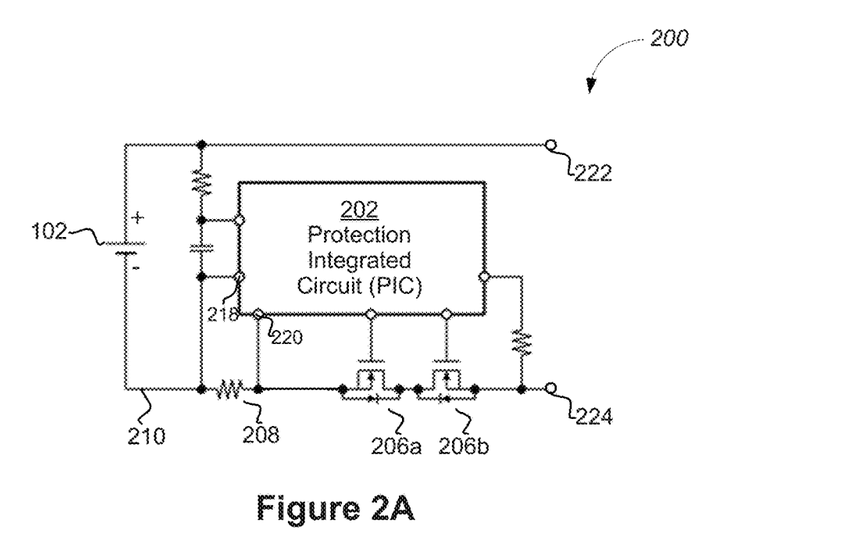
FIGS. 2A and 2B illustrate battery protection systems having one or more protection integrated circuits (PICs), in accordance with some implementations.
Figure 2B:
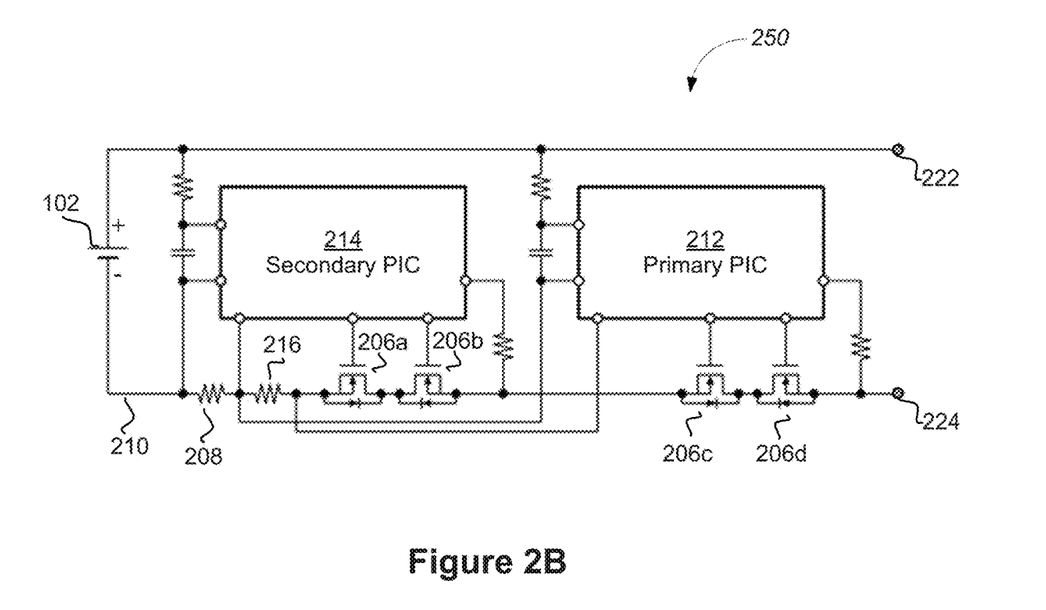

FIGS. 2A and 2B illustrate two example battery protection systems 200 and 250, in accordance with some implementations. FIGS. 2A and 2B are provided for explanation purposes and do not include all of the features of the present disclosure. FIG. 2A shows a single protection integrated circuit (PIC) 202, a battery 102, and one or more switches 206. The PIC 202 controls charging and discharging of the battery 102 through its internal logic and operation of the one or more switches 206. The one or more switches 206 are coupled to the battery 102 and facilitate the charging and discharging of the battery 102 as instructed by the PIC 202. In some implementations, the one or more switches 206 are coupled in series to each other along a charging path (e.g., charging and discharging path 210) of the battery 102. In particular, the PIC 202 directs the current as needed to protect the battery 102 as described below. The battery 102 and the PIC 202 are electrically coupled in parallel between high and low battery supply nodes 222 and 224.

A serial resistor 208 is coupled in series with the battery 102 and the one or more switches 206 along the charging and discharging path 210 of the battery 102. In some implementations, the serial resistor 208 is immediately downstream of the battery 102 on a direct current (DC) charging and discharging path 210 (e.g., along the same current path that is going through the battery 102). In some implementations, the PIC 202 is coupled to the serial resistor 208. The PIC 202 is configured using internal/integrated comparator logic to monitor a voltage drop on the serial resistor 208 (coupled to the PIC 202 via the inputs 218 and 220) and determine whether a drive current of the battery 102 is at fault, e.g., whether the battery 102 is overcharged, undercharged, or shorted based on the voltage drop on the serial resistor 208. In some implementations, the PIC 202 includes a comparator configured to compare the voltage drop with one or more threshold voltages defined according to the undercharge, overcharge, or short currents.

In some implementations, the PIC 202 is configured to turn off a charging switch (e.g., switch 206b of the one or more switches 206) arranged on the charging and discharging path 210 of the battery 102 to disable charging of the battery 102. The charging switch 206b is turned off in accordance with a determination that the battery 102 is overcharged based on the voltage drop across the serial resistor 208. In some implementations, the PIC 202 is configured to turn off a discharging switch (e.g., switch 206a of the one or more switches 206) arranged on the charging and discharging path 210 of the battery 102 to disable discharging of the battery 102. The discharging switch 206a is turned off in accordance with a determination that the battery 102 is undercharged based on the voltage drop on the serial resistor 208.

In some implementations, the charging switch 206b and the discharging switch 206a are coupled in series with each other on the charging and discharging path 210 of the battery 102. In some implementations, the PIC 202 is configured to control charging and discharging of the battery 102 via the charging switch 206b and the discharging switch 206a, respectively. In some implementations, each of the charging and discharging switches 206b and 206a includes a transistor device having a gate controlled by the PIC 202. In some other implementations, each of the charging and discharging switches 206b and 206a includes a transmission gate made of a pair of P-type and N-type transistors.

FIG. 2B shows a primary PIC 212 and a secondary PIC 214, a single battery 102, and one or more switches 206. In some implementations, the primary PIC 212 and the secondary PIC 214 are similar to the PIC 202 discussed with reference to FIG. 2A (e.g., they perform all of the PIC functions described with reference to FIG. 2A). The differences between the primary and secondary PICs 212 and 214 are the sensitivities of the respective PICs that are used for controlling the charging and discharging of the battery 102 via the one or more switches 206 (discussed in more detail below). In some implementations, two or more PICs are used to improve the overall safety of the electronic device. More specifically, the secondary PIC 214 is used as a fall back in case the primary PIC 212 fails. Further shown in FIG. 2B is a high battery supply node 222 and a low battery supply node 224. The battery 102, the primary PIC 212, and the secondary PIC 214 are electrically coupled in parallel between the high and low battery supply nodes 222 and 224, and the secondary PIC 214 is disposed between the battery 102 and the primary PIC 212. In some situations, both the primary PIC 212 and secondary PIC 214 are applied in the electronic device 100 to comply with a device safety standard, e.g., Standard for Household and Commercial Batteries UL 2054, Standard for Audio/Video (AV) and Information and Communication Technology (ICT) Equipment IEC 62368-1.

In some implementations, the primary and secondary PICs 212 and 214 are coupled to the battery 102. In some implementations, each PIC is configured to control a respective subset of switches 206. For example, the primary PIC 212 is configured to control the switches 206c and 206d, and the secondary PIC 214 is configured to control the switches 206a and 206b. As mentioned above in FIG. 2A, the one or more switches 206 are used with the respective PICs to control charging and discharging of the battery 102. In particular, the one or more switches 206 are coupled to the battery 102 and facilitate discharging and charging of the battery 102 as instructed by the primary PIC 212 and/or the secondary PIC 214. In some implementations, the one or more switches 206 are coupled in series to each other along a charging path (e.g., charging and discharging path 210) of the battery 102.

In some implementations, a first serial resistor 208 and a second serial resistor 216 are coupled in series with each other, and in series with the battery 102 along the charging and discharging path 210 of the battery 102. In some implementations, the same amount of direct current is configured to flow through the first serial resistor 208, the second serial resistor 216, and the battery 102 during charging and discharging of the battery 102. Similar to the configuration of FIG. 2A, the first serial resistor 208 and the second serial resistor 216 are immediately downstream of the DC charging and discharging path 210. In some implementations, the primary PIC 212 and the secondary PIC 214 are coupled to the first and second serial resistors 208 and 216 and configured to monitor voltage drops on the first and second serial resistors 208 and 216. The primary PIC 212 and the secondary PIC 214 determine whether the battery 102 is overcharged, undercharged, or shorted based on the voltage drops on the first and second serial resistors 208 and 216, respectively. In some implementations, the primary PIC 212 monitors the voltage drop across the second serial resistor 216 to determine whether the drive current of the battery is at fault, e.g., whether the battery 102 is overcharged, undercharged, or shorted. In some implementations, the secondary PIC 214 monitors the voltage drop across the first serial resistor 208 to determine whether the drive current of the battery is at fault, e.g., whether the battery 102 is overcharged, undercharged, or shorted.

In some implementations, the primary PIC 212 is configured to control charging and discharging of the battery 102 according to a plurality of first charging and discharging settings (e.g., sensitivities for the primary PIC 212), and the secondary PIC 214 is configured to control charging and discharging of the battery 102 according to a plurality of second charging and discharging settings (e.g., sensitivities for the secondary PIC 214). Optionally, each of the second charging and discharging settings corresponds to and is distinct from a respective one of the first charging and discharging settings.

Similar to FIG. 2A, in some implementations, the primary and secondary PICS 212 and 214 are configured to turn off a charging switch (e.g., switch 206b and 206d of the one or more switches 206) arranged on the charging and discharging path 210 of the battery 102 to disable charging of the battery 102. The charging switch 206b is turned off in accordance with a determination that the battery 102 is at risk of overcharging based on the voltage drop on the first and second serial resistors 208 and 216 and the respective charging and discharging settings (e.g., first and second charging and discharging settings) of the primary and secondary PICS 212 and 214. Further, in some implementations, the primary and secondary PICS 212 and 214 are configured to turn off a discharging switch (e.g., switch 206a and 206c of the one or more switches 206) arranged on the charging and discharging path 210 of the battery 102 to disable discharging of the battery 102. The discharging switch 206a is turned off in accordance with a determination that the battery 102 is undercharged based on the voltage drop on the first and second serial resistors 208 and 216 and the respective charging and discharging settings (e.g., first and second charging and discharging settings) of the primary and secondary PICS 212 and 214.

As with FIG. 2A, in some implementations, the charging switches (switches 206b and 206d) and the discharging switches (switches 206a and 206c) are coupled in series with each other on the charging and discharging path 210 of the battery 102. In some implementations, the primary and secondary PICS 212 and 214 are configured to control charging and discharging of the battery 102 via respective charging switches (switches 206b and 206d) and respective discharging switch (switches 206a and 206c), respectively. In some implementations, each of the charging and discharging switches (206a-206d) includes a transistor device having a gate controlled by respective PICs (e.g., the primary and secondary PICs 212 and 214). In some other implementations, each of the charging and discharging switches (206a-206d) includes a transmission gate made of a pair of P-type and N-type transistors.

For simplicity, FIGS. 2A and 2B describe a single battery 102; however, it should be noted that the battery 102 can include a plurality of rechargeable battery cells electrically coupled at least partially in parallel as described above with reference to FIG. 1B.

Figure 3A:
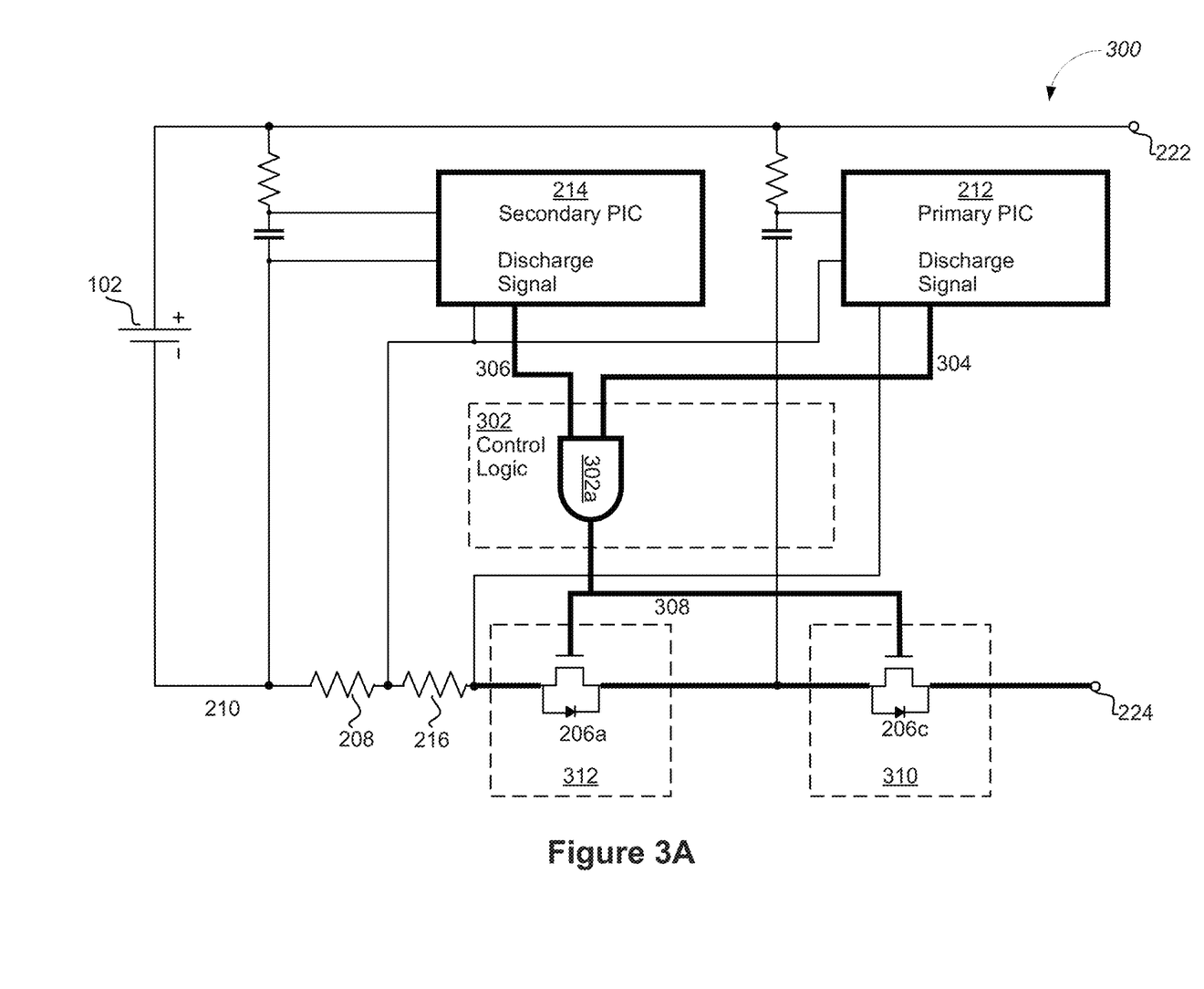
FIGS. 3A and 3B illustrate battery protection systems including control logic and one or more PICs, in accordance with some implementations.
Figure 3B:
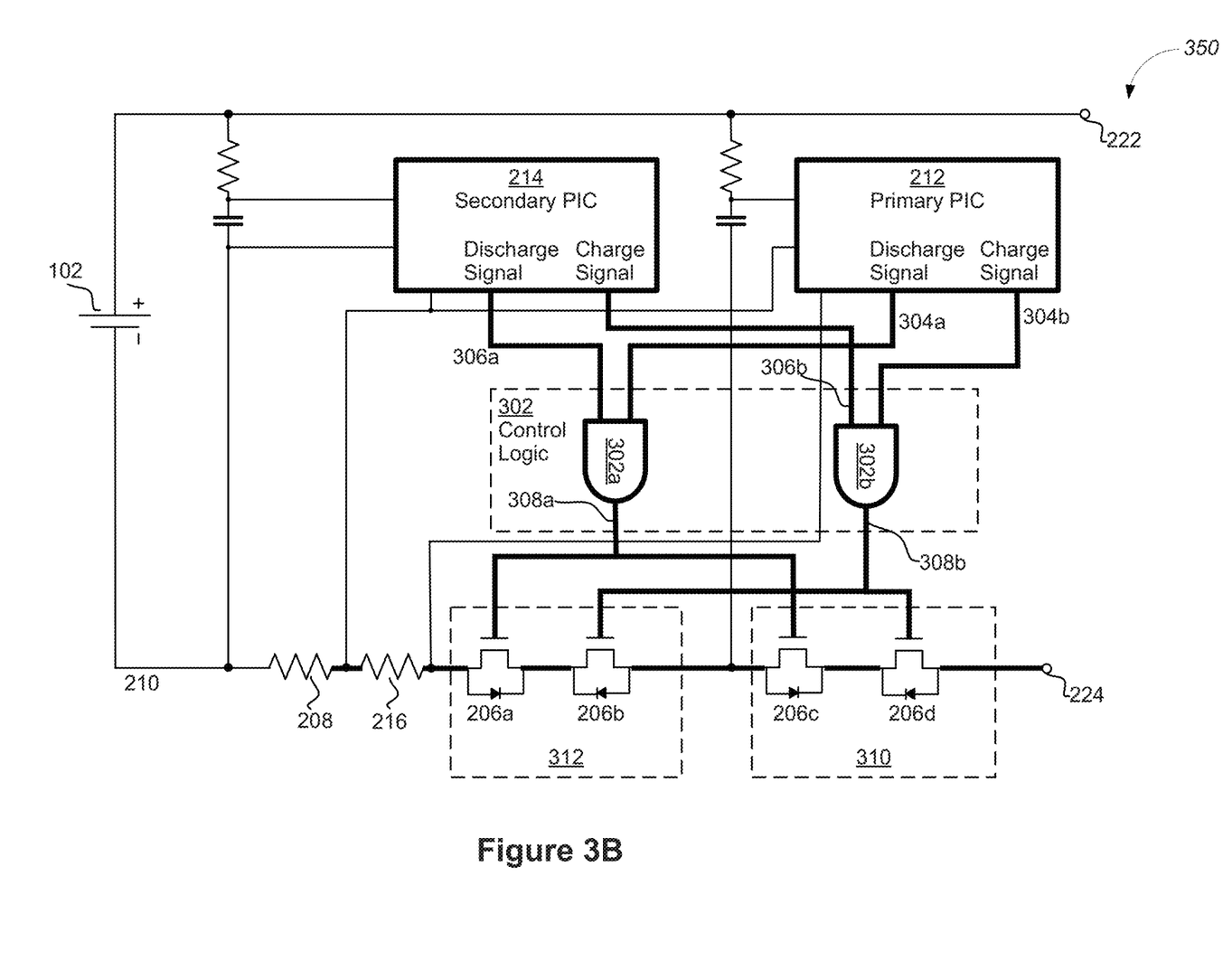

FIGS. 3A and 3B illustrate battery protection systems 300 and 350 including control logic and one or more protection integrated circuits, in accordance with some implementations. Particularly, FIGS. 3A and 3B illustrate further improvements on the dual PIC architecture described above with reference to FIG. 2B. In addition to the PICs 212 and 214 and switches 206, each of the battery protection systems 300 and 350 further includes control logic 302. The control logic 302 is configured to combine one or more first switching signals 304 generated by the primary PIC 212 and one or more second switching signals 306 generated by the secondary PIC 214 and generate and provide one or more combined switching signals 308. In some implementations, the control logic 302 includes at least one of an AND logic and an OR logic to combine the first and second switching signals 304 and 306. The control logic 302 is further configured to provide the one or more combined switching signals 308 to respective switching components 310 and 312. By these means, the control logic 302 prevents the secondary PIC 214 from triggering the respective switching component 312 before the primary PIC 212 triggers the switching component 310, thereby protecting one or more components of the battery 102 and/or battery protection system 104 from being damaged.

In some implementations, the control logic 302 allows the primary and secondary PICs 212 and 214 to be interchanged with each other. The primary and secondary PICs 212 and 214 do not need to have distinct charging and discharging settings (e.g., first and second charging and discharging settings) as required and described above with reference to FIG. 2B. In some implementation, use of the control logic 302 allows the primary and secondary PICs 212 and 214 to be substantially identical to each other and separately arranged on two distinct substrates. For example, in some implementations, the primary and secondary PICs 212 and 214 are off-the-shelf components having electrical characteristics controlled with a predetermined tolerance (e.g., specified by the manufacturer). The control logic 302 may synchronize the operation of the primary and secondary PICs 212 and 214, and the primary and secondary PICs 212 and 214 do not have to be configured and/or designed to ensure that they trigger their respective switching components 206 according to a predefined order (i.e., in which the primary PIC 212 triggers before the secondary PIC 214).

More specifically, in some implementations not using the control logic 302 (e.g., FIG. 2B), the primary and secondary PICs 212 and 214 are identical, while each of the PICs 212 and 214 includes an extra pack pin. Each identical PIC is configured to be the primary PIC 212 or secondary PIC 214 via an input of the respective extra pack pin. Conversely, in some implementations using the control logic 302 (e.g., FIGS. 3A and 3B), each identical PIC is used as the PIC 212 or 214 in an exchangeable manner, independently of whether the input to the respective extra pack pin is applied or not. By these means, use of the control logic 302 allows for greater flexibility on the primary and secondary PICs 212 and 214 than those implementations described in FIGS. 2A and 2B.

In some implementations, the control logic 302 is a discrete component. Alternatively, in some implementations, the control logic 302 is integrated in the primary PIC 212 or the secondary PIC 214. In some implementations, the control logic 302 is controlled via pin logic of the primary or secondary PIC that integrates the control logic 302. Thus, the primary PIC 212, secondary PIC 214, and control logic 302 may enable and disable a charging and discharging current of the battery 102 jointly to protect the battery 102 and battery protection system 104, e.g., by preventing oscillations, current leakage, and breakdowns of transistors (e.g., MOSFETs).

The control logic 302 is electrically coupled to and configured to control both of the first and second switching components 310 and 312. The first and second switching components 310 and 312 are electrically coupled in series on a DC charging and discharging path 210 of the battery 102. Each switching component 310 or 312 is configured to control (e.g., connect and disconnect) the DC charging and discharging path 210 using the combined switching signals 308 provided by the control logic 302.

In some implementations, a first serial resistor 208 and a second serial resistor 216 are coupled in series with each other, and in series with the battery 102 along the charging and discharging path 210 of the battery 102 as described above with reference to FIG. 2B. The first serial resistor 208 and the second serial resistor 216 are coupled to the primary PIC 212 and the secondary PIC 214, respectively.

Referring to FIG. 3A, in some implementations, the first and second switching signals 304 and 306 are used to control a discharging process of the battery 102. The primary and secondary PICs 212 and 214 are coupled to respective subsets of one or more switches 206 via the control logic 302. The first switching component 310 includes a discharging switch 206c coupled to the control logic 302, and the second switching component 312 includes a discharging switch 206a coupled to the control logic 302. Specifically, in an example, the control logic 302 includes an AND logic that couples respective discharge switching signals 304 and 306 of the primary and secondary PICs 212 and 214. The control logic 302 is configured to combine the respective discharge switching signals 304 and 306 of the primary and secondary PICs 212 and 214 and provide the combined switching signal 308 to their respective discharging switches (e.g. 206a and 206c).

The primary PIC 212 is coupled to the battery 102 and is configured to determine whether a drive current of the battery 102 is at fault (e.g., by monitoring the voltage drop across the second serial resistor 216). The primary PIC 212 generates one or more first switching signals 304 indicating whether the drive current of the battery 102 is at fault. The fault is optionally an overcharge, undercharge, or short circuit. The secondary PIC 214 is coupled to the battery 102 and is configured to determine whether the drive current of the battery 102 is at fault (e.g., by monitoring the voltage drop across the first serial resistor 208). The secondary PIC 214 generates one or more second switching signals 306 indicating whether the drive current of the battery 102 is at fault.

In the discharging process, the one or more first switching signals 304 include a first discharge switching signal indicating whether the drive current of the battery 102 falls out of a first discharge current range during discharging of the battery. For example, the primary PIC 212 generates a discharge switching signal based on the voltage drop across the second serial resistor 216. In some implementations, the one or more second switching signal 306 includes a second discharge switching signal indicating whether the drive current of the battery 102 falls out of a second discharge current range during discharging of the battery 102.

Given the use of the control logic 302, the primary and secondary PICs 212 and 214 are used in an interchangeable manner. In some implementations, the first discharge current range associated with the primary PIC 212 contains the second discharge current range associated with the secondary PIC 214. In some implementations, the first discharge current range associated with the primary PIC 212 is contained within or substantially equal to the second discharge current range associated with the secondary PIC 214. Alternatively, in some implementations, the first discharge current range associated with the primary PIC 212 is offset from the second discharge current range associated with the secondary PIC 214. The battery protection system 300 function properly in all of these implementations due to the use of the control logic 302. That said, the first and second serial resistors 208 and 216 are also similar or identical, while the primary and secondary PICs 212 and 214 are optionally distinct, similar, or identical. Instead of relying on the PICs 212 and 214 triggering their respective switching components in a predefined order, the battery protection system 300 applies the control logic 302 to ensure that either one of the primary PIC 212 and the secondary PIC 214 controls the switching components 310 and 312 at the same time.

In a battery discharging scenario shown in FIG. 3A, if the first and second discharge switching signals 304 and 306 both indicate that there is no fault in the same battery 102, then the DC charging and discharging path 210 is enabled to allow the battery 102 to drive the internal circuit 106; conversely, if either of the first and second discharge switching signals 304 or 306 indicates that there is a fault, then the DC charging and discharging path 210 is disabled and does not allow the battery to drive the internal circuit 106. it will be apparent to one of ordinary skill in the art that a battery charging scenario can be similarly established using the control logic 302 like the battery discharging scenario shown in FIG. 3A.

Referring to FIG. 3B, in some implementations, the first and second switching signals 304 and 306 are used to control both charging and discharging processes of the battery 102. Each of the first switching signals 304 and 306 includes a respective discharge switching signal 304a or 306a and a respective charge switching signal 304b or 306b. The control logic 302 includes two gates 302a and 302b. The gate 302a includes a first AND or gate configured to combine the discharge switching signals 304a and 306a of the first and second switching signals 304 and 306. The gate 302b includes a second AND or gate configured to combine the charge switching signals 304b and 306b of the first and second switching signals 304 and 306. The gate 302b is distinct from the gate 302a. Each of the first and second switching components 310 and 312 includes a discharging switch 206c/206a and a charging switch 206d/206b. Both of the discharging switches 206a and 206c are controlled by a combined switching signal 308a generated by the gate 302a, and both of the charging switches 206b and 206d are controlled by a combined switching signal 308b generated by the gate 302b.

The one or more first switching signals 304 (corresponding to the primary PIC 212) include a first charge switching signal 304b indicating whether the drive current of the battery falls out of a first charge current range during charging of the battery 102. The one or more second switching signals 306 (corresponding to the secondary PIC 214) include a second charge switching signal 306b indicating whether the drive current of the battery 102 falls out of a second charge current range during charging of the battery 102. Optionally, the first discharge current range contains, is contained within, is offset from, or is equal to the second discharge current range. In some implementations, the control logic 302 includes a second AND logic (e.g., charge AND logic 302b) configured to combine the first and second charge switching signals 304b and 306b to provide a second combined switching signal 308b. The first switching component includes a first charging switch (e.g., charging switch 206d coupled to the primary PIC 212) and the second switching component includes a second charging switch (e.g., charging switch 206b coupled to the secondary PIC 214), the first and second charging switches 206d and 206b are coupled to the second AND logic 302b. The first and second charging switches 206d and 206b are configured to control charging of the battery based on the second combined switching signal 308b.

The one or more first switching signals (corresponding to the primary PIC 212) includes a first discharge switching signal 304a indicating whether the drive current of the battery 102 falls out of a first discharge current range during discharging of the battery. The one or more second switching signals (corresponding to the secondary PIC 214) includes a second discharge switching signal 306a indicating whether the drive current of the battery 102 falls out of a second discharge current range during discharging of the battery 102. Optionally, the first discharge current range contains, is contained within, is offset from, or is equal to the second discharge current range. In some implementations, the control logic 302 includes the first AND logic (e.g., discharge AND logic 302a) configured to combine the first and second discharge switching signals 304a and 306a to provide a first combined switching signal 308a. The first switching component includes a first discharging switch (e.g., discharging switch 206c coupled to the primary PIC 212) and a second switching component includes a second discharging switch (e.g., discharging switch 206a coupled to the secondary PIC 214). The first and second discharging switches 206c and 206a are coupled to the first AND logic 302a and are configured to control discharging of the battery 102 based on the second combined switching signal.

The implementation of the control logic 302 in FIG. 3B allows the battery protection system 104 to combine respective charge switching signals during a battery charging process and to combine respective discharge switching signals during a battery discharging process. In the battery charging process, if the first and second charge switching signals 304b and 306b both indicate that there is no fault, then the DC charging and discharging path 210 is enabled to allow the battery 102 to be charged by an external power source 108. Conversely, if either of the first and second charge switching signals 304b or 306b indicates that there is a fault, then the DC charging and discharging path 210 is disabled and does not allow the battery 102 to be charged by the external power source 108 without knowing whether the primary PIC 212 or secondary PIC 214 is triggered. More details on the discharging scenario is described above with reference to FIG. 3A. As such, as the first and second serial resistors 208 and 216 are similar or identical, the control logic 302 allows the primary PIC 212 and the secondary PIC 214 to be used in an interchangeable manner, independently of their respective characteristics regarding charging or discharging control.

Figure 4:
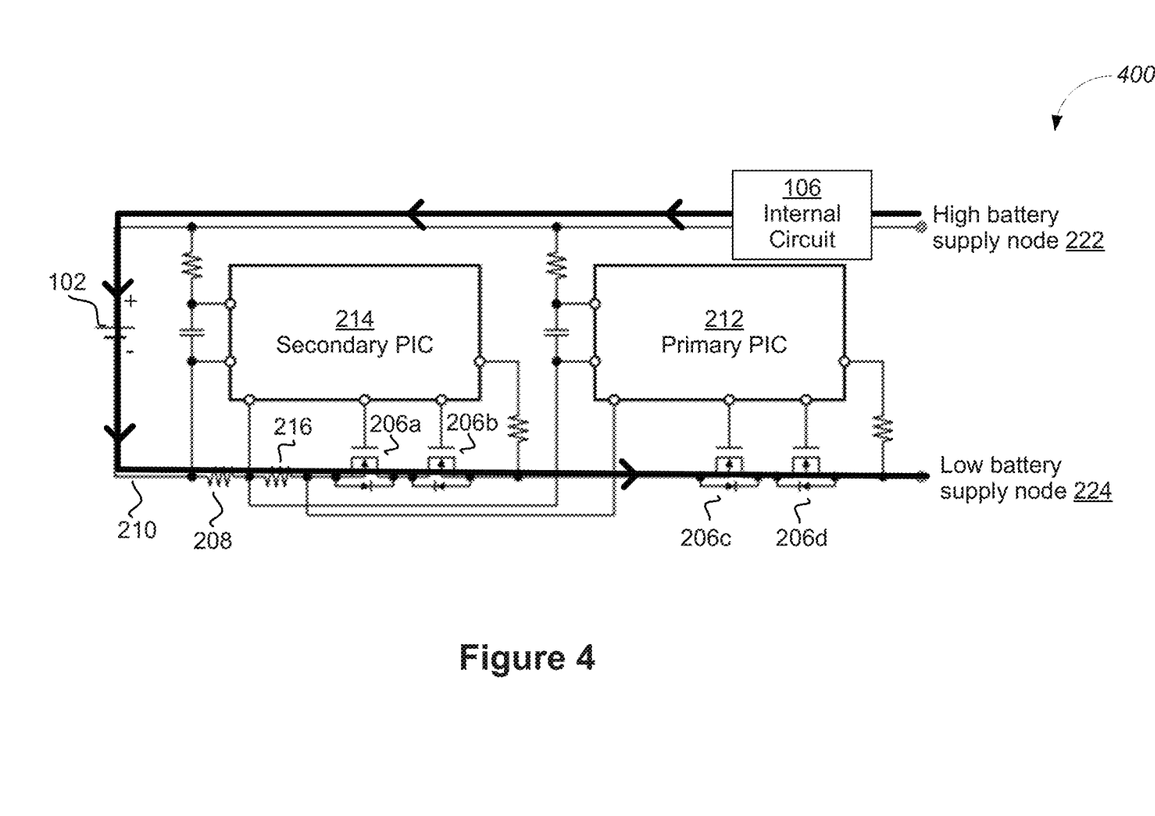
FIG. 4 illustrates an example current path in a battery protection system when a battery is charged by an external power source, in accordance with some implementations.

FIG. 4 illustrates an example current path 400 in a battery protection system 250 when a battery 102 is charged by an external power source 108, in accordance with some implementations. The primary and secondary PICs 212 and 214 are coupled to a high battery supply node 222 and a low battery supply node 224. The battery supply nodes 222 and 224 are coupled to the external power source 108. Current flows from the high battery supply node 222, passes the internal circuit 106 and battery 102, and exits the battery protection system 250 through the low battery supply node 224. This happens when no fault (e.g., overcharge, undercharge, or short circuit) is detected by the PICs 212 and 214. The current is provided to the battery 102 until a charging switch (e.g., 206*b* or 206*d*) and/or a discharging switch (e.g., 206*a* or 206*c*) is turned off as described above with reference to in FIGS. 2A-2B and 3A-3B.

Likewise, in some implementations not shown in FIG. 4, the battery 102 is discharged to drive the internal circuit 106 of the electronic device 100. The external power source 108 is optionally disconnected. Drive current flows from an anode to a cathode of the battery 102. The discharging switches 206*a* and 206*c* are used to control the DC charging and discharging path 210, e.g., disabling the current flow from the battery 102 upon detection of one or more faults during battery discharging.

Figure 5:
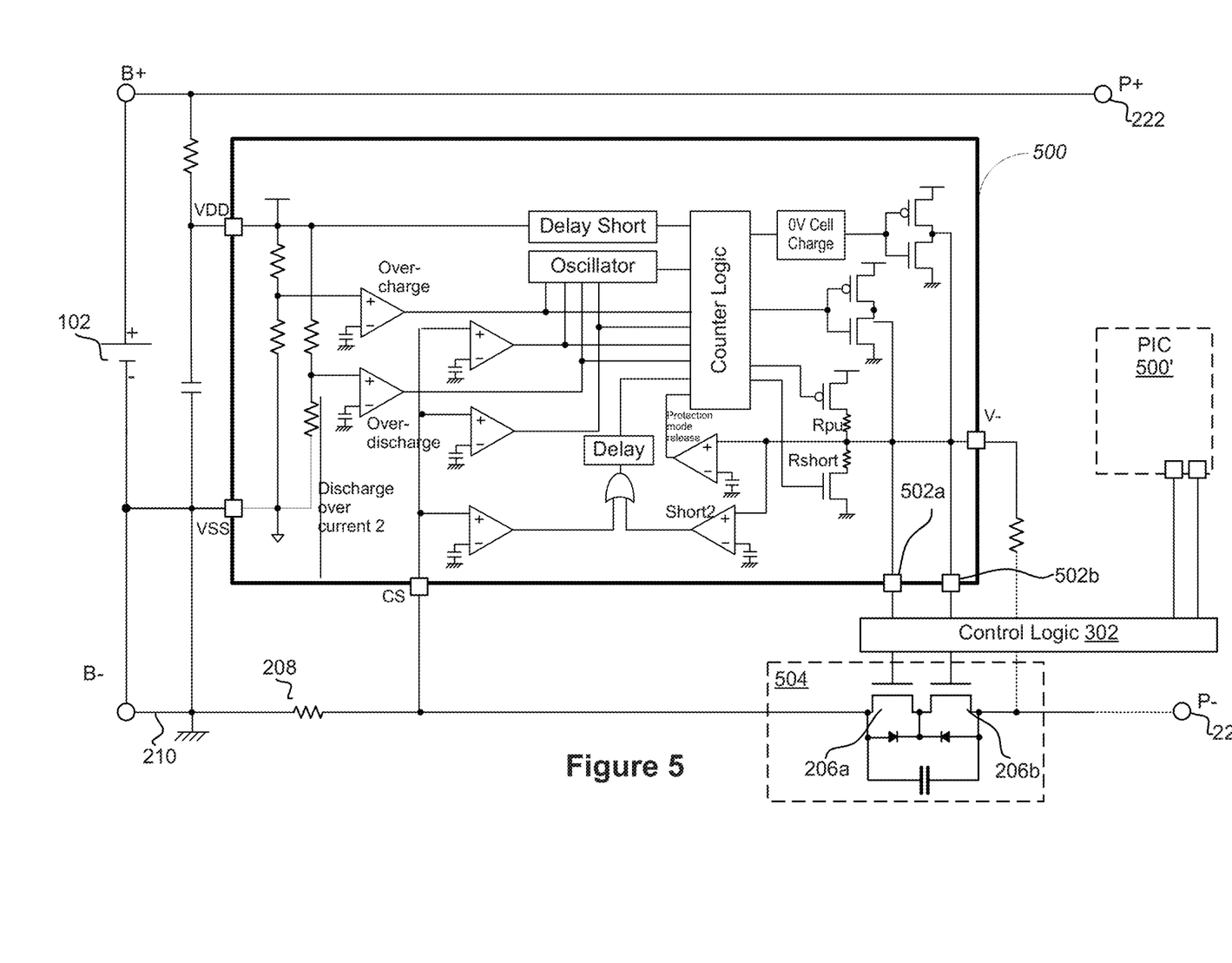
FIG. 5 illustrates a circuit diagram of an example PIC, in accordance with some implementations.

FIG. 5 illustrates a circuit diagram of an example protection integrated circuit (PIC) 500, in accordance with some implementations. The PIC 500 is optionally used as a PIC 202, 212, or 214 in FIGS. 2A-4. The PIC 500 includes one or more electronic components configured to define charging and discharging settings of the PIC 500, e.g., a first charge current range, a second charge current range, a first discharge current range, and a second discharge current range. That said, the one or more components are configured to set the overcharge, undercharge, and short conditions detected to determine whether the discharging and/or charging switches (e.g., switches 206) should be turned on or off.

A serial resistor 208 is electrically coupled in series with a battery 102 on a DC charging and discharging path 210 of the battery 102. In some implementations, the same amount of direct current is configured to flow through the serial resistor 208 and the battery 102 during charging and discharging of the battery 102. In some implementations, the serial resistor 208 is immediately downstream of the battery 102 on the DC charging and discharging path 210. In some implementations, the PIC 500 is coupled to the battery 102 and the serial resistor 208. The PIC 500 is configured to receive a voltage drop across the serial resistor 208 and determine whether a drive current of the battery 102 is at fault. The PIC 500 is further configured to generate one or more switching signals 502 (e.g., a discharge switching signal 502*a* and a charge switching signal 502*b*), indicating whether the drive current of the battery 102 is at fault during a battery charging or discharging process. In some implementations, a switching component 504 (having switches 206*a* and 206*b*) electrically coupled in series on the DC charging and discharging path 210 of the battery 102. The switching component 504 is electrically coupled to the PIC 500 and configured to receive the one or more switching signals 502 for controlling the DC charging and discharging path 210.

Further, in some implementations, control logic 302 is coupled between the PIC 500 and the switches 206 if the PIC 500 is used with another PIC 500', which optionally has identical or distinct settings and is interchangeable with the PIC 500. For example, referring to FIGS. 3A and 3B, use of the control logic 302 allows the PICs 212 and 214 to be interchangeable with one another. In some implementations, the primary PIC 212 and the secondary PIC 214 are identical or similar to one another. In some implementations, the primary PIC 212 and the secondary PIC 214 are off-the-shelf components having electrical characteristics controlled with a predetermined tolerance that are set forth in a specification by the manufacturer. Because the control logic 302 allows for the use of the same or similar PICs 500, the one or more components of each PIC 500 do not need to be adjusted to define one or more distinct charging and discharging settings, e.g., using an extra pack pin of the respective PIC 500. Conversely, in some implementations, the primary PIC 212 and the secondary PIC 214 have distinct settings for detecting overcharge, undercharge, and short conditions, and their positions in the battery protection system are interchangeable when the control logic 302 is applied.

In some implementations, a method is implemented to protect a battery 102 that is already coupled to at least one PIC (e.g., PIC 202, 212 or 214). A first PIC (e.g., the primary PIC 212 in FIGS. 3A and 3B) is coupled to the battery and configured to determine whether a drive current of the battery is at fault and generate one or more first switching signals indicating whether the drive current of the battery 102 is at fault. A second PIC (e.g., the secondary PIC 214 in FIGS. 3A and 3B) coupled to the same battery 102 and configured to determine whether the drive current of the battery 102 is at fault and generate one or more second switching signals indicating whether the drive current of the same battery 102 is at fault. This method focuses on adding control logic to couple to the first and second PICs. The control logic is configured to combine the first and second switching signals to provide a first combined switching signal. A first switching component and a second switching component are electrically coupled in series on a DC charging and discharging path of the battery, and each switching component is coupled to the control logic and configured to control the DC charging and discharging path using the first combined switching signal.

It should be noted that details described with respect to any one of the battery protection systems in FIGS. 1-5 are also applicable in an analogous manner to any other one of the battery protection systems in FIGS. 1-5. For brevity, the analogous details are not repeated.

Reference has been made in detail to implementations, examples of which are illustrated in the accompanying drawings. In the above detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail to not obscure aspects of the implementations.

The terminology used in the description of the various described implementations herein is for the purposes of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

What is claimed is:

1. A battery protection system of a battery, comprising:
a first protection integrated circuit (PIC) coupled to the battery and configured to determine whether a drive current of the battery is at fault and generate one or more first switching signals indicating whether the drive current of the battery is at fault;
a second PIC coupled to the battery and configured to determine whether the drive current of the battery is at fault and generate one or more second switching signals indicating whether the drive current of the battery is at fault;
control logic coupled to the first PIC and the second PIC, the control logic being configured to combine the first and second switching signals to provide a first combined switching signal;
a first switching component and a second switching component, the first and second switching components being electrically coupled in series on a direct current (DC) charging and discharging path of the battery, and each switching component being coupled to the control logic and configured to control the DC charging and discharging path using the first combined switching signal;
a first serial resistor electrically coupled in series with the battery on the DC charging and discharging path of the battery, a same amount of direct current being configured to flow through the first serial resistor and the battery during charging and discharging of the battery; and
the first PIC is coupled to the first serial resistor and configured to receive a first voltage drop across the first serial resistor and determine, based on the first voltage drop, whether the drive current of the battery is at fault.

2. The battery protection system of claim 1, comprising:
the first serial resistor and a second serial resistor identical to the first serial resistor, the first and second serial resistors being electrically coupled in series with each other and in series with the battery on the DC charging and discharging path of the battery, and a same amount of direct current being configured to flow through the first and second serial resistors and the battery during charging and discharging of the battery.

3. The battery protection system of claim 1, wherein:
for each of the first and second PICs, the drive current of the battery is determined to be at fault when the drive current falls out of a respective charge current range during charging of the battery or when the drive current falls out of a respective discharge current range during discharging of the battery.

4. The battery protection system of claim 3, wherein for at least one of the first and second PICs, the respective charge current range is distinct from the respective discharge current range.

5. The battery protection system of claim 3, wherein for the first and second PICs, the respective charge current ranges of the first and second PICs are distinct from each other, and the respective discharge current ranges of the first and second PICs are distinct from each other.

6. The battery protection system of claim 1, wherein:
each of the first and second switching components includes a respective charging switch and a respective discharging switch; and
for each switching component, the respective charging and discharging switches are electrically coupled in series and configured to control charging and discharging of the battery, respectively.

7. The battery protection system of claim 6, wherein each of the charging and discharging switches includes a transistor device having a gate controlled by the first PIC.

8. The battery protection system of claim 1, wherein the control logic includes at least one of an AND logic and an OR logic configured to combine the first and second switching signals.

9. The battery protection system of claim 1, wherein the first and second PICs are substantially identical to each other and separately arranged on two distinct substrates.

10. The battery protection system of claim 1, further comprising a high battery supply node and a low battery supply node, wherein the battery, the first PIC and the second PIC are electrically coupled in parallel between the high and low battery supply nodes, and the second PIC is disposed between the battery and the first PIC.

11. The battery protection system of claim 10, wherein:
the one or more first switching signal includes a first discharge switching signal indicating whether the drive current of the battery falls out of a first discharge current range during discharging of the battery;
the one or more second switching signal includes a second discharge switching signal indicating whether the drive current of the battery falls out of a second discharge current range during discharging of the battery, the first discharge current range being contained within the second discharge current range;
the control logic includes a first AND logic configured to combine the first and second discharge switching signals to provide a second combined switching signal; and
the first switching component includes a first discharging switch and the second switching component includes a second discharging switch, the first and second discharging switches being coupled to the first AND logic and configured to control discharging of the battery based on the second combined switching signal.

12. The battery protection system of claim 10, wherein:
the one or more first switching signals include a first charge switching signal indicating whether the drive current of the battery falls out of a first charge current range during charging of the battery; and
the one or more second switching signals include a second charge switching signal indicating whether the drive current of the battery falls out of a second charge current range during charging of the battery, the first charge current range being contained within the second charge current range.

13. The battery protection system of claim 12, wherein:
the control logic includes a second AND logic configured to combine the first charge switching signal and the second charge switching signal to provide a second combined switching signal; and
the first switching component includes a first charging switch and the second switching component includes a second charging switch, the first charging switch and the second charging switch being coupled to the second AND logic and configured to control charging of the battery based on the second combined switching signal.

14. The battery protection system of claim 1, wherein:
the battery protection system is enclosed in an electronic device with the battery;
the battery protection system is configured to be charged via a cable connected to an external power source; and
the electronic device includes a power connector exposed on an exterior surface of the electronic device and configured to receive the cable for charging the battery.

15. The battery protection system of claim 14, wherein the electronic device is one of a camera device, a doorbell, a hazard detector, a display assistance device, or a speaker assistance device.

16. The battery protection system of claim 1, wherein the first and second PICs are interchangeable with each other in the battery protection system.

17. The battery protection system of any of claim 1, wherein the first and second PICs are the same type of electronic components having electrical characteristics controlled with a predetermined tolerance.

18. A method for protecting a battery, comprising:
at a battery protection system of the battery the battery protection including a first protection integrated circuit (PIC) coupled to the battery, a second PIC coupled to the battery, control logic coupled to the first PIC and the second PIC, a first switching component and a second switching component, and a first serial resistor electrically coupled in series with the battery on a direct current (DC) charging and discharging path of the battery, a same amount of direct current being configured to flow through the first serial resistor and the battery during charging and discharging of the battery, the first switching component and the second switching component being electrically coupled in series on the DC charging and discharging path of the battery, the first PIC being coupled to the first serial resistor and configured to receive a first voltage drop across the first serial resistor and determine, based on the first voltage drop, whether a drive current of the battery is at fault, and each switching component being coupled to the control logic:
determining, by the first PIC, whether a drive current of the battery is at fault;
generating, by the first PIC, one or more first switching signals indicating whether the drive current of the battery is at fault;
determining, by the second PIC, whether the drive current of the battery is at fault,
generating, by the second PIC, one or more second switching signals indicating whether the drive current of the battery is at fault
combining, via the control logic, the first and second switching signals to provide a first combined switching signal; and controlling, via the first switching component and the second switching component, the DC charging and discharging path using the first combined switching signal.

19. A method of protecting a battery, comprising:
providing a first protection integrated circuit (PIC) coupled to the battery and configured to determine whether a drive current of the battery is at fault and generate one or more first switching signals indicating whether the drive current of the battery is at fault;
providing a second PIC coupled to the battery and configured to determine whether the drive current of the battery is at fault and generate one or more second switching signals indicating whether the drive current of the battery is at fault;
providing control logic coupled to the first PIC and the second PIC, the control logic being configured to combine the first switching signals and the second switching signals to provide a first combined switching signal;
providing a first switching component and a second switching component, the first switching component and the second switching component being electrically coupled in series on a direct current (DC) charging and discharging path of the battery, and each switching component being coupled to the control logic and configured to control the DC charging and discharging path using the first combined switching signal; and
providing a high battery supply node and a low battery supply node, wherein the battery, the first PIC and the second PIC are electrically coupled in parallel between the high and low battery supply nodes, and the second PIC is disposed between the battery and the first PIC.

20. The method of claim 19, wherein:
the one or more first switching signal includes a first discharge switching signal indicating whether the drive current of the battery falls out of a first discharge current range during discharging of the battery;
the one or more second switching signal includes a second discharge switching signal indicating whether the drive current of the battery falls out of a second discharge current range during discharging of the battery, the first discharge current range being contained within the second discharge current range;
the control logic includes a first AND logic configured to combine the first and second discharge switching signals to provide a second combined switching signal; and
the first switching component includes a first discharging switch and the second switching component includes a second discharging switch, the first and second discharging switches being coupled to the first AND logic and configured to control discharging of the battery based on the second combined switching signal.

21. The method of claim 19, wherein:
the one or more first switching signals include a first charge switching signal indicating whether the drive current of the battery falls out of a first charge current range during charging of the battery; and
the one or more second switching signals include a second charge switching signal indicating whether the drive current of the battery falls out of a second charge current range during charging of the battery, the first charge current range being contained within the second charge current range.

22. The method of claim 21, wherein:
the control logic includes a second AND logic configured to combine the first charge switching signal and the second charge switching signal to provide a second combined switching signal; and
the first switching component includes a first charging switch and the second switching component includes a second charging switch, the first charging switch and the second charging switch being coupled to the second AND logic and configured to control charging of the battery based on the second combined switching signal.

* * * * *